P. F. HELLERSTEDT.
AUXILIARY SPRING.
APPLICATION FILED MAR. 17, 1914.
1,107,067.
Patented Aug. 11, 1914.
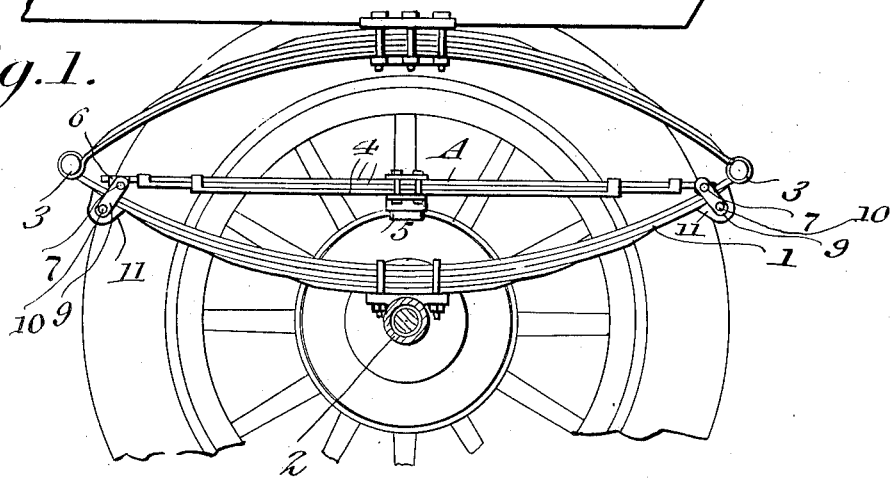
Fig. 1.
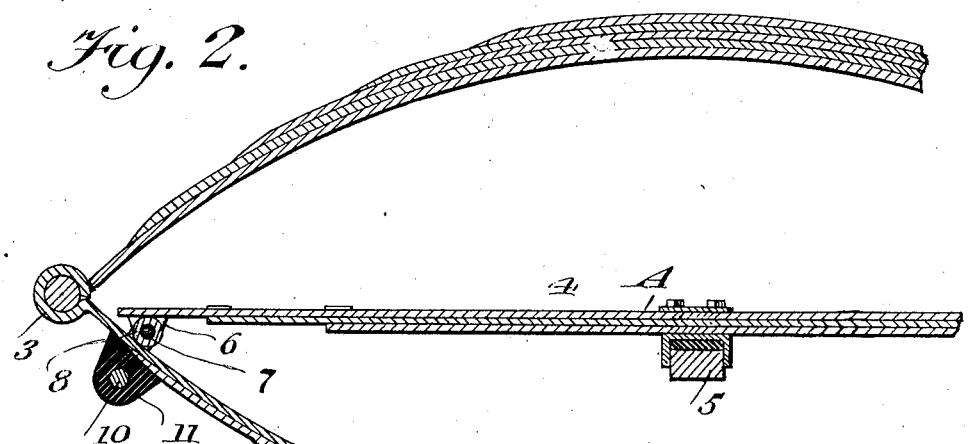
Fig. 2.
Fig. 3.
Peter F. Hellerstedt, Inventor
By Victor J. Evans, Attorney
Witnesses

UNITED STATES PATENT OFFICE.

PETER F. HELLERSTEDT, OF CHATTANOOGA, TENNESSEE.

AUXILIARY SPRING.

1,107,067.   Specification of Letters Patent.   Patented Aug. 11, 1914.

Application filed March 17, 1914. Serial No. 825,309.

*To all whom it may concern:*

Be it known that I, PETER F. HELLERSTEDT, a citizen of the United States, residing at Chattanooga, in the county of Hamilton and State of Tennessee, have invented new and useful Improvements in Auxiliary Springs, of which the following is a specification.

This invention relates to auxiliary springs for vehicles of all kinds, the said spring being especially designed for use in combination with the present day body supporting springs of automobiles, motor trucks and similar vehicles.

The principal object of the present invention is to provide an auxiliary spring of such construction that when applied to and used in connection with the primary body supporting spring, the said auxiliary spring will not interfere with the action of the main spring but will be normally idle yet so associated with the main spring that in case of breakage of the main spring, the auxiliary spring will be immediately thrown into use and will continue to resiliently support the vehicle body. The auxiliary spring is also designed to act in supplemental relation to the main spring in case of unusually severe impacts and shocks.

With the above and other objects in view, the invention consists in the novel construction, combination and arrangement of parts, as will hereinafter be more fully described, illustrated and claimed.

In the accompanying drawings:—Figure 1 is a side elevation of a sufficient portion of an automobile to illustrate the application of the spring of this invention thereto. Fig. 2 is a vertical longitudinal section on an enlarged scale through one end of the combined main spring and auxiliary spring. Fig. 3 is a detail perspective view of one end of the auxiliary spring showing the pivoted yoke and cushioning means.

Referring to the drawings 1 designates the primary or main body supporting spring now in common use in automobiles the same being centrally connected to the axle 2 and having the terminal eyes or knuckles 3 by means of which the opposite ends of the said primary or main spring are connected to the frame and body of the machine.

In carrying out the present invention I provide what I term an auxiliary or idler spring indicated at A, the same, in the preferred embodiment thereof, being composed of any desired number of leaves 4 and having attached to the center thereof a fulcrum or abutment block 5 located over the axle so as to bear thereon in case the primary spring 1 should become broken. At its opposite ends the auxiliary spring A is provided with downwardly extending pairs of lugs or ears 6 through which are inserted pins or bolts 7. Around these pins or bolts are placed rollers 8 which are adapted to roll against the upper surface of the main or primary spring 1. Connected to the same pins or bolts 7 are yokes composed of oppositely arranged links 9 which extend on opposite sides of the edges of the spring 1 and are connected beneath said spring by means of pins or bolts 10. Around these bolts 10 are placed springs 11 shown in the form of rubber blocks or bumpers and constituting the cushioning means bearing against the under side of the main or primary spring and serving to take up any looseness between the springs and prevent the same from rattling.

It will be observed by reference to Fig. 1 that the auxiliary spring A is normally idle or inoperative and is not attached to any part of the vehicle but only attached to the spring 1. Therefore, under ordinary conditions, there is no stress or load on the auxiliary spring A and it is only when the main spring is subjected to excessive shocks that the auxiliary springs comes into play and acts in supplemental relation to said main spring. The chief advantage of the auxiliary spring, however, resides in the fact that when the main or primary spring 1 breaks, said auxiliary spring immediately takes the place of the broken spring and by retainting its grip on the end portions of the main spring, it yieldingly supports the body of the vehicle and enables the machine to be driven to a repair point without any inconvenience whatever.

What I claim is:—

1. An auxiliary spring for the purpose set forth provided with rollers at the extremities thereof, and end yokes adapted to embrace the terminal portions of a vehicle spring, said yokes being pivotally attached to said auxiliary spring.

2. An auxiliary spring for the purpose set forth provided with rollers at the extremities thereof, end yokes adapted to embrace the terminal portions of a vehicle spring, and cushioning means carried by said yokes.

3. An auxiliary spring for the purpose set forth provided with rollers at the extremities thereof, end yokes adapted to embrace the terminal portions of a vehicle spring, and an abutment block attached to said auxiliary spring.

In testimony whereof I affix my signature in presence of two witnesses.

PETER F. HELLERSTEDT.

Witnesses:
M. Y. ROBERTS,
C. W. TOMLINSON.